United States Patent Office 3,085,952
Patented Apr. 16, 1963

3,085,952
IRRADIATION ISOMERIZATION
Raymond C. Odioso, Shaler Township, Allegheny County, Bruce K. Schmid, McCandless Township, Allegheny County, and Robert C. Zabor, Shaler Township, Allegheny County, Pa., assignors to Gulf Research & Development Company, Pittsburgh, Pa., a corporation of Delaware
No Drawing. Filed Nov. 10, 1958, Ser. No. 772,662
4 Claims. (Cl. 204—154)

This invention relates to a method for isomerizing aliphatic paraffins and more particularly to a method for isomerizing aliphatic paraffins of the gasoline boiling range in the presence of a solid catalyst and hydrogen while subjecting the reaction zone to ionizing radiation.

The isomerization of aliphatic paraffins is an important procedure in the petroleum and chemical industries. For example, it is important in the petroleum industry for converting straight chain paraffins or singly branched paraffins to their more highly branched isomers of higher octane rating. A known process for isomerizing paraffins of the gasoline boiling range is the low temperature process (195 to 400° F.) which uses Friedel-Crafts catalysts such as aluminum chloride. It is also known to isomerize paraffins at higher temperatures in the presence of hydrogen and solid isomerization catalysts of the types used for naphtha reforming. However, the equilibrium concentrations of the branched chain isomers are highest at temperatures lower than can be satisfactorily employed in the hydroisomerization procedures that employ reforming-type catalysts. The Friedel-Crafts catalysts, which can be used for isomerization at low temperatures at which the equilibrium concentration of branched chain paraffins is favorable, have serious drawbacks. For example, the halide catalysts are corrosive to metals. Therefore, interest has turned toward the higher temperature hydroisomerization processes which use the more desirable solid isomerization catalysts of the reforming type, such as platinum on alumina. The latter type of operation, despite the restriction of a lower equilibrium concentration of the desired branched chain isomers at the necessary higher reaction temperatures, has sufficient advantages, including high reaction rate and the use of a more easily handled catalyst, to make its use greatly favored over low temperature isomerization with Friedel-Crafts catalysts. The fact remains, however, that a need exists for a process that can employ the desirable solid isomerization catalysts at lower temperatures than have heretofore been considered feasible so as to obtain the benefit of an equilibrium more favorable for branched chain paraffin production.

We have now developed such a process. Our process in general comprises contacting an aliphatic paraffin of the gasoline boiling range with a solid isomerization catalyst in the presence of hydrogen at elevated temperature and pressure and in the presence of ionizing radiation.

In a preferred embodiment of our process normal pentane is contacted with a catalyst comprising a minor amount of platinum and a major amount of alumina in the presence of hydrogen while irradiating the reaction zone with ionizing radiation.

It has previously been suggested to subject various solid catalysts to ionizing radiation to improve their catalytic properties and then to use the irradiated catalyst for catalytic conversions but without the continuous application of ionizing radiation to the reaction zone. This work has met with some success, although to the best of our knowledge it has not been applied to paraffin isomerization processes. It has also been suggested to promote chemical reactions in the absence of catalysts by the influence of ionizing radiation. However, to the best of our knowledge, this has not been suggested for the isomerization of aliphatic paraffins and, in any event, our own studies have indicated no appreciable promotion of paraffin isomerization by irradiation in the absence of an isomerization catalyst. Our present invention is based on the discovery that the isomerization of aliphatic paraffins in the presence of hydrogen and a solid isomerization catalyst can be promoted by subjecting the reaction zone to ionizing radiation so that the desired isomerizations can be effected at considerably lower temperatures than would be required for the same degree of conversion in the absence of radiation.

The catalyst for our process can be any of the known solid isomerization catalysts for isomerizing aliphatic paraffins in the presence of hydrogen. These are usually similar to the catalysts employed in catalytic reforming of naphtha, although in some instances they have important differences from the usual reforming catalysts. Catalysts of the type suitable for the process of the invention comprise a minor amount, e.g., 0.1 to 10 weight percent, of a component such as the metals of group VIII of the periodic table or the oxides or sufides of chromium, molybdenum, tungsten or vanadium, or the mixtures of the same, composited with a major amount of a porous catalytic support. Suitable supports include porous materials such as alumina, silica-stabilized alumina, bauxite, silica-alumina, silica-magnesia, silica-boria, silica-zirconia, silica-alumina-ziroconia and the like.

The catalyst can contain small amounts of agents such as halogens which promote the isomerization activity of the catalyst or of agents such as silica which stabilize the catalyst against heat damage. An example of a particularly valuable catalyst is a supported platinum or palladium catalyst comprising platinum or pallidium on alumina and containing, for example, from 0.1 to 5.0 weight percent, and preferably, 0.2 to 1.0 weight percent of platinum or palladium deposited on the alumina. This catalyst can also contain a small amount, for example, 0.5 to 5.0 weight percent of a halogen such as fluorine and/or chlorine which promote isomerization activity and a minor amount, for example, 2.0 to 10.0 weight percent of silica which serves as a catalyst stabilizer.

The process of the invention is not limited to use of any particular physical system of catalytic contact. Our use of ionizing radiation can be applied to any of the known systems of catalytic contact, including contact with a fixed, stationary bed of pelleted catalyst, contact with a fixed or moving bed of fluidized, finely divided catalyst and contact with a downwardly moving bed of catalyst which flows gravitationally through the irradiated zone.

The charge stock for our isomerization process comprises aliphatic paraffins of the gasoline boiling range and more particularly $C_4$ to $C_8$ aliphatic paraffins. The charge stock can be a single aliphatic paraffin of this range or a mixture of such paraffins or a gasoline range fraction consisting predominantly of one or more of such paraffins. Preferred charge stocks include n-butane, n-pentane and n-hexane which are to be converted to their more valuable branched chain isomers. However, the charge stocks can also be the singly branched aliphatic paraffins such as methylpentanes and methylhexanes which are to be converted to their more highly branched isomers of higher octane rating. Although minor amounts of gasoline range hydrocarbons other than the aliphatic paraffins can be present, naphthenes normally have a deleterious effect on the reaction either by inhibiting the isomerization reaction or by causing the formation of deactivating deposits on the catalysts. Therefore, to obtain the best catalytic activity and long catalyst life without the necessity of frequent regeneration the charge stock should have no more than a low content of naphthenes. The preferred charge stocks contain at least 85 volume percent aliphatic paraffins. A particularly preferred charge stock is a hydrocarbon fraction comprising at least 85 volume percent n-pentane and the rest consisting essentially of other open chain paraffins.

In carrying out our process the hydrocarbon charge stock is contacted with a catalyst of the type described in admixture with hydrogen and at elevated temperature and pressure while continuously irradiating the catalytic zone with ionizing radiation. Promotion by ionizing radiation of the isomerization of paraffins absorbed on a solid isomerization catalyst can be achieved over a wide range of conditions but, the preferred conditions for our process, except for temperature, will be the same as the conditions that are preferred for catalytic paraffin hydroisomerization in the absence of radiation. When employing a catalyst composed of platinum or palladium on alumina, important advantages are obtained by the use of the novel combination of hydroisomerization conditions disclosed in U.S. Patent No. 2,831,908, but with an appropriately lower temperature. These conditions include a low hydrogen concentration of less than one mol of hydrogen per mol of hydrocarbon and a high liquid-hourly space velocity of greater than 5 volumes of hydrocarbon per volume of catalyst per hour. Although these conditions are preferred, benefits can be obtained by carrying out the process in the presence of ionizing radiation under any of the known conditions for isomerization of paraffins in the presence of hydrogen and solid isomerization catalysts. Thus, in general, the conditions that can be used include pressure of 20–1000 p.s.i.g., the preferred range being 300 to 600 p.s.i.g.; hydrogen concentration of 0.1 to 10 mols per mol of hydrocarbon, the preferred range being 0.1 to 1.0 mol ratio; and liquid-hourly space velocity of 1.0 to 100 volumes per volume per hour, the preferred space velocity being at least 5 vol./vol./hr. The temperature will be considerably lower, e.g., 200 to 400° F. lower, than the temperature required for the same degree of conversion under otherwise identical conditions and catalyst in the absence of radiation. In any event, the temperature for our process will be maintained within the range of 300 to 800° F., the exact temperature to be used depending upon other variables such as catalyst activity, space velocity and irradiation rate.

In our process the aliphatic paraffins to be isomerized are exposed to ionizing radiation while mixed with hydrogen and adsorbed on a solid isomerization catalyst. The ionizing radiation can be obtained by the use of radio isotopes, nuclear reactors or high energy particle accelerators. Examples of the radio isotopes are cobalt 60 for gamma and strontium 90 for beta radiation. Operating nuclear reactors of intermediate or full power size can be used as a source for either gamma rays or neutrons or both. Neutron radiation can be used if the formation of permanent radioactivity in the hydrocarbon products is not undesirable but would not be used if the hydrocarbons are intended for use as motor fuels. Particle accelerators such as the cyclotron, Van de Graaff or X-ray machines can also be used. An accelerator such as the Van de Graaff accelerator is desirable for producing high energy electron radiation which does not cause permanent radioactivity in the material exposed to irradiation.

In this specification we have used the term "ionizing radiation" to identify the type of radiation suitable for our process. By this term we mean to include all forms of high energy radiation that are effective to promote the catalytic isomerization by contributing to the formation of the free radicals or ions that are believed to form as a step in the mechanism of paraffin isomerization. Thus, while we do not wish to be bound by theoretical explanations of the practical results we have observed, it is generally accepted that in the mechanism of paraffin isomerization the paraffin is first dehydrogenated, the resulting olefin readily forms a reactive intermediate, possibly a carbonium ion, then isomerizes and, finally, the isomeric intermediate is hydrogenated to yield the saturated branched chain isomer. Various types of ionizing or high energy radiation as disclosed above are known to be effective for promoting the dehydrogenation step of the isomerization reaction and are, therefore, suitable for our purposes.

In accordance with our invention the aliphatic paraffins can be irradiated in a batch operation, the paraffins, hydrogen and catalyst being subjected to irradiation in a quiescent state in a closed vessel maintained at the appropriate reaction conditions or the process can be carried out continuously by charging the paraffin-hydrogen mixture to a catalytic zone exposed to ionizing radiation and maintained at the desired process conditions. Whether the process is carried out continuously or batch-wise the catalytic contacting zone can be subjected to irradiation such as mentioned above in a number of suitable ways. For instance, if the source of radiation is a nuclear reactor, the catalyst and reactants can be placed in a well in a nuclear reactor or the catalyst can be disposed in a tube which traverses the reactor and the hydrocarbon-hydrogen mixture can be continuously flowed therethrough.

As another possibility a neutron-free radiation source can be obtained directly from a homogeneous reactor by separating the radioactive fission gases, xenon and krypton, from the reactor core by conventional or modified gas-liquid separating means. The fission gases have a very high intensity of beta and gamma radiation but a very short half life. These gases possess about one percent of the total fission energy. The gases are chemically inert and will not form undesired products with the hydrocarbons and they are readily separable from the hydrocarbons. Therefore, they can be used for subjecting the hydrocarbons absorbed on the catalyst to radiation by mixing them directly with the hydrocarbon charge and separating them from the product. Even if small concentrations of the gases remain in the product after separation, the short half life will usually make them unobjectionable. Instead of being mixed directly with the reactants the radioactive gases can be used to supply radiation to the catalytic zone by indirect contact therewith, for example, by flowing them in a conduit through the catalytic zone.

The use of a particle accelerator for producing high energy electron radiation can be illustrated by reference to the Van de Graaff accelerator. The radiation produced by the Van de Graaff accelerator is in the form of an electron beam with an energy of, for example, 3 million electron volts. The beam is uni-directional and the material to be irradiated is placed directly in the beam. The dimensions of the beam or the scanning area of the beam differ with different machines and can be varied somewhat with any particular machine. The depth of penetration of the electrons varies directly as the beam voltage and inversely to the density of the material irradiated. From this it follows that for complete irradiation of the catalytic zone the most desirable vessel depth for the catalytic vessel would equal the depth of penetration. All of the radiation energy produced by the electron beam is eventually converted to heat and, while cooling and temperature control are important considerations with all of the sources of radiation that we have mentioned as we will discuss more fully, they are particularly important with the high energy electron beam produced by an accelerator.

Temperature control is important in our process. The catalyst and reactants absorb at least a portion of the large amount of energy of the radiation to which they are subjected. The absorbed energy is eventually converted almost entirely into heat and, therefore, care must be exercised to avoid overheating the catalytic zone and the vessel. Since it is an advantage of our process that isomerization reactions can be carried out in low temperature ranges favorable for branched chain isomer production it is important to control temperature and, especially, to maintain a temperature below 800° F.

The heat resulting from irradiation can be removed from the catalytic zone in a number of ways. For instance, the charge stock can be introduced to the catalytic zone at a temperature considerably below the desired isomerization temperature. Also, cooling means can be provided. For example, the catalytic zone can be provided with interior cooling coils in contact with the flowing hydrocarbons or can be provided with means for contacting outer walls of the catalytic vessel with a coolant fluid. As we have mentioned briefly, the use of a high energy electron beam, such as produced by a Van de Graaff accelerator, requires particular care in control of temperature inasmuch as almost all of the energy of the beam is directed into the catalytic vessel and is absorbed by it or its contents.

In subjecting the catalytic isomerization zone and the hydrocarbons therein to irradiation, it is important to control the rate of irradiation and the dosage or radiation energy absorbed by the catalytic zone and its contents. We will discuss dosage in terms of the radiation energy absorbed by both the catalyst and the reactants. In general, promotion of the isomerization reaction in accordance with our invention can be achieved by dosages ranging from about 100 to about 100,000 joules of energy absorbed per gram of catalyst and reactants per hour of operation. Owing to the fact that the catalyst will be much more dense than the reactants, especially if the reactants are in the vapor phase, and the fact that the amount of energy absorbed is proportional to the density of the material, most of the energy absorbed in the catalytic zone will be absorbed by the catalyst. However, some of the energy will be absorbed by the flowing reactants whether in the liquid or vapor phase and, therefore, the rate of flow or space velocity of the reactants will in some degree influence the desired rate of irradiation. Irradiation rates of the range described can be achieved, for instance, with a three-million electron volt (mev.) Van de Graaff accelerator producing an electron beam at an output current from 50 to 1,000 microamperes.

EXAMPLE

The charge stock was pure grade n-pentane admixed with hydrogen in a concentration corresponding to a mol fraction of hydrocarbon of 0.7 or a mol ratio of hydrogen to hydrocarbon of about 0.43:1. The preheated charge stock was charged in the vapor phase at a pressure of 500 p.s.i.g. to the catalytic bed containing a pelleted, commercial platinum-on-alumina catalyst containing about 0.6 weight percent platinum, 0.6 weight percent chlorine and the balance alumina and disposed in a high pressure catalytic vessel. The catalytic vessel was provided with a thin stainless steel window which was positioned under the electron beam of a Van de Graaff accelerator operated at a beam voltage and current of 3 mev. and 1,000 microamperes, corresponding to a dose rate of 75,000 joules per hour per gram of catalyst plus reactants, based upon an estimated 40 percent dosage absorption by the catalyst and reactants, the remainder being primarily absorbed by the vessel. The thin steel window permitted passage of a portion of the electron beam from the accelerator into the catalytic zone. The walls of the catalytic vessel were provided with passages through which cooling water was continuously passed to control the temperature. Temperature measurement was accomplished by means of thermocouples inserted in a series of thermowells extending from the bottom of the catalytic vessel into the catalytic zone. In another run the same procedure was carried out under essentially the same conditions, except for temperature, and in the absence of radiation. Further details of process conditions and of results of these runs in terms of conversion to isopentane at various average catalyst bed temperatures are given in the following table. In the table conversion is reported as mols of isopentane produced per hundred mols of n-pentane charged.

*Table I*

EFFECT OF CONTINUOUS ELECTRON IRRADIATION ON ISOMERIZATION OF n-PENTANE TO i-PENTANE

Catalyst: 0.6 weight percent platinum-on-alumina.
Pressure: 500 p.s.i.g.
Liquid-hourly space velocity: 24.0 volumes of n-$C_5$/volumes of catalyst/hr.
Feed ratio: 0.7 mol fraction hydrocarbon=0.43 mol $H_2$/mol n-$C_5$

| Run 1—Without Irradiation | | Run 2—Electron Irradiation by 3 mev. Van de Graaff | |
|---|---|---|---|
| Temperature, °F. | Conversion to i-$C_5$, mol percent | Temperature, °F. | Conversion to i-$C_5$, mol percent |
| 700 | 2.0 | 265 | 0.6 |
| 753 | 3.5 | 285 | 1.5 |
| 800 | 5.0 | 375 | 15.5 |
| 850 | 27.5 | 415 | 23.5 |
| | | 425 | 23.5 |

The results listed in the above table show the beneficial influence of ionizing radiation on the isomerization of a normal-paraffin adsorbed on a solid catalyst. Thus in run 2 temperatures were employed at which substantially no isomerization of n-pentane is observed in the absence of irradiation with the catalyst and conditions employed. However, through the influence of ionizing radiation a substantial production of isomer is obtained at the low temperatures of 375 to 425° F. By interpolation of the data for run 1 carried out in the absence of radiation it can be seen that conversions of 15 to 24 mol percent equal to those obtained in run 2 would have required use of a temperature over 400° F. higher than used in the irradiation run 2. Although apparatus difficulties prevented testing of the irradiation run at higher conversion levels, the results obtained show an important advantage for carrying out the catalytic hydroisomerization of an n-paraffin in the presence of ionizing radiation.

Obviously many modifications and variations of the invention as hereinbefore set forth may be made without departing from the spirit and scope thereof and therefore only such limitations should be imposed as are indicated in the appended claims.

We claim:

1. The process for isomerizing aliphatic paraffins which comprises contacting a charge consisting of $C_4$–$C_8$ aliphatic paraffin with a solid isomerization catalyst selected from the group consisting of platinum, palladium, the oxides and sulfides of chromium, molybdenum, tungsten, vanadium and mixtures thereof composited with a major amount of a porous catalytic support, in the presence of added hydrogen at a temperature of 300° to 800° F., and a hydrogen concentration of from 0.1 to 10 mols of hydrogen per mol of hydrocarbon while subjecting the paraffin in contact with said catalyst to high energy neutron-free ionizing radiation at a rate from 100 to 100,000 joules per gram of catalyst and reactants per hour.

2. The process for isomerizing a charge consisting of $C_4$ to $C_8$ aliphatic paraffin which comprises contacting such paraffin in the presence of added hydrogen with platinum composited with a major amount of a porous support isomerization catalyst, at a temperature from 300° to 800° F., and a hydrogen concentration from 0.1 to 10 mols per mol of hydrocarbon while subjecting the catalytic contacting zone to high energy neutron-free ionizing radiation at a rate from 100 to 100,000 joules per gram of catalyst and reactants per hour.

3. The paraffin isomerization process which comprises contacting a charge consisting of gasoline range hydrocarbon containing at least 85 volume percent $C_4$–$C_8$ aliphatic paraffin with a catalyst selected from the group consisting of platinum, palladium, the oxides and sulfides of chromium, molybdenum, tungsten, vanadium and mixtures thereof composited with a major amount of a porous catalytic support, in the presence of added hydrogen and at a temperature from 300° to 800° F. while subjecting the catalytic contacting zone to high energy neutron-free ionizing radiation at a rate from 100 to 100,000 joules per gram of catalyst and reactants per hour.

4. The paraffin isomerization process which comprises contacting a charge consisting of gasoline range hydrocarbon containing at least 85 volume percent $C_4$–$C_8$ aliphatic paraffin with a catalyst selected from the group consisting of platinum, palladium, the oxides and sulfides of chromium, molybdenum, tungsten, vanadium and mixtures thereof composited with a major amount of a porous catalytic support, in the presence of added hydrogen, at a temperature from 375° to 800° F. while subjecting the catalytic contacting zone to high energy neutron-free ionizing radiation at a rate from 100 to 100,000 joules per gram of catalyst and reactants per hour and separating an isomerized gasoline product of improved octane rating.

References Cited in the file of this patent

UNITED STATES PATENTS

| | | |
|---|---|---|
| 2,743,223 | McClinton et al. | Apr. 24, 1956 |
| 2,831,908 | Starnes et al. | Apr. 22, 1958 |
| 2,872,396 | Wilson et al. | Feb. 3, 1959 |
| 2,905,606 | Long et al. | Sept. 22, 1959 |

FOREIGN PATENTS

| | | |
|---|---|---|
| 1,148,720 | France | June 24, 1957 |